US007727381B2

(12) United States Patent
Fukuyama et al.

(10) Patent No.: US 7,727,381 B2
(45) Date of Patent: Jun. 1, 2010

(54) HYDROCRACKING CATALYST AND METHOD OF HYDROCRACKING HEAVY OIL

(75) Inventors: Hidetsugu Fukuyama, Chiba (JP); Satoshi Terai, Chiba (JP); Masayuki Uchida, Chiba (JP)

(73) Assignee: Toyo Engineering Corporation, Narashino-shi (JP)

( * ) Notice: Subject to any disclaimer, the term of this patent is extended or adjusted under 35 U.S.C. 154(b) by 184 days.

(21) Appl. No.: 11/649,006

(22) Filed: Jan. 3, 2007

(65) Prior Publication Data

US 2007/0131587 A1    Jun. 14, 2007

Related U.S. Application Data

(62) Division of application No. 10/990,084, filed on Nov. 16, 2004.

(30) Foreign Application Priority Data

Nov. 28, 2003   (JP)   ............................. 2003-398454

(51) Int. Cl.
    *C10G 47/04*   (2006.01)
(52) U.S. Cl. ....................... 208/121; 208/106; 208/108; 208/112; 208/113; 502/180; 502/185
(58) Field of Classification Search ................ 208/108, 208/112–113, 121, 106; 502/152–153, 180, 502/185
See application file for complete search history.

(56) References Cited

U.S. PATENT DOCUMENTS

| 3,978,000 | A | 8/1976 | Schmitt et al. |
| 4,978,649 | A | 12/1990 | Surovikin et al. |
| 5,358,634 | A | 10/1994 | Rankel |
| 5,364,524 | A | 11/1994 | Partridge et al. |
| 5,374,350 | A | 12/1994 | Heck et al. |
| 5,624,547 | A | 4/1997 | Sudhakar et al. |
| 6,334,947 | B1 * | 1/2002 | De Boer et al. ........ 208/111.25 |
| 6,797,153 | B1 | 9/2004 | Fukuyama et al. |
| 2003/0119665 | A1 | 6/2003 | White |

FOREIGN PATENT DOCUMENTS

| CA | 2306942 | * | 10/2000 |
| DE | 100 20 723 | A1 | 11/2000 |
| EP | 0 707 886 | A1 | 4/1996 |
| EP | 0707886 | A1 * | 4/1996 |
| GB | 1 461 297 | | 1/1977 |
| GB | 1461297 | * | 1/1977 |
| JP | 2001-009282 | | 1/2001 |

OTHER PUBLICATIONS

Fukuyama, H. et al. (2004). Catalysis Today, 98, 207-215.*
Speight, J.G. in The Desulfurization of Heavy Oils and Residua, Marcel Dekker (1981) (31 pages).
Speight, J.G. in The Chemistry and Technology of Petroleum, Marcel Dekker (1980) (3 pages).
Godfried M.K. Abotsi and Alan W. Scanroni in Fuel Processing Technology, 22, pp. 107-133 (1989) (27 pages).
Terai et al. "Hydrocracking of Heavy Oil Using Iron-active Carbon Catalyst—Importance of Mesopore Structure of Active Carbon-," Sekiyu Gakkaishi, 43, (1), 17-24 (2000).
Cano et al. "Development of Carbon Catalyst for Heavy Oil Hydrocracking," 2002 NPRA Annual Meeting, San Antonio, Texas, Mar. 17-19, 2002, Paper No. AM-02-14.
Fukuyama et al. "Active carbon catalyst for heavy oil upgrading," Catalysis today 98 (2004) 207-215. Published online Sep. 11, 2004.
Nakamura et al. "Development of new disposable catalyst for waste plastics treatment for high quality transportation fuel," Catalysis Today 27 (1996) 175-179.

* cited by examiner

*Primary Examiner*—Robert J Hill, Jr.
*Assistant Examiner*—Brian McCaig
(74) *Attorney, Agent, or Firm*—Flynn, Thiel, Boutell & Tanis, P.C.

(57) ABSTRACT

In a process of hydrocracking heavy oil with a catalyst in petroleum refining, asphaltene contained in heavy oil, and impurities including heavy metals such as nickel and vanadium, are efficiently removed with activated carbon, whereby the reduction in catalyst activity or formation of coke by the impurities can be prevented. The invention provides a hydrocracking catalyst comprising activated carbon extrudate as a carrier activated with steam and having a high distribution of pores having pore sizes in the range of 20 to 200 nm.

6 Claims, 6 Drawing Sheets

101 pressure regulator  102 flow rate controller  103 stirrer  104 autoclave
105 cooling device  106 separator  107 back-pressure valve  108 integrating gas flow rate meter

HYDROCRACKING CATALYST AND METHOD OF HYDROCRACKING HEAVY OIL

This is a division of Ser. No. 10/990,084, filed Nov. 16, 2004.

TECHNICAL FIELD

The present invention relates to a hydrocracking catalyst and to a method of hydrocracking heavy oil by using it. More specifically, it relates to a method wherein in a step of hydrocracking heavy oil with a catalyst in petroleum refining, asphaltene and impurities including metals such as nickel and vanadium contained in heavy oil are removed with activated carbon so that the reduction in catalyst activity or formation of coke by the impurities is prevented.

PRIOR ARTS

A method of treating heavy oil with a catalyst includes fluid catalytic cracking (FCC), hydrocracking, etc. In fluid catalytic cracking, raw oil is fluidized together with a silica alumina catalyst or a zeolite catalyst, and pyrolyzed to produce gasoline mainly. The catalyst on which coke formed and accumulated in the cracking reaction is recycled and reused after the coke is burned in a regenerating tower.

In hydrocracking, heavy oil is hydrocracked with an alumina supported catalyst in high-pressure hydrogen thereby producing naphtha, kerosene and gas oil, while impurities such as sulfur, nitrogen, nickel and vanadium are removed. The coke formed in the reaction, and nickel and vanadium released from asphaltene by cracking, are accumulated on the catalyst, and thus the catalyst is exchanged or replenished with a new catalyst. In hydrocracking, a guard reactor is arranged in a previous stage such that the nickel and vanadium are captured with an alumina catalyst having pores of relatively large pore size to remove the metal.

Generally, the pore size means "diameter" so that when the present specification refers to pore size, "diameter" is referred to. In a graph or in analysis of pore size, however, "radius" is generally used in discussion, and thus "radius" is referred to in a graph in the present specification.

In the process using these catalysts, the catalysts are deactivated by asphaltene, nickel, vanadium etc. contained in a raw oil, and thus the amount of the catalysts used is increased.

To solve this problem in the process using these catalysts, a method of removing asphaltene and impurities such as nickel and vanadium in a raw oil by pre-treating the raw oil includes a process of removing impurities with a solvent, which involves merely extracting light fraction free of impurities from heavy distillates containing a large amount of impurities with a solvent to separate them from each other. These prior art techniques are described briefly by Speight, J. G. in The Desulfurization of Heavy Oils and Residua, Marcel Dekker (1981).

Mobile (U.S. Pat. No. 5,364,524 and U.S. Pat. No. 5,358,634) discloses a method of using activated carbon as a catalyst used in hydrocracking and a method of hydrocracking with metal together with activated carbon.

In the activated carbon catalyst prescribed in these US publications, the volume of pores having a diameter size of 100 to 400 Å (10 to 40 nm) is at least 0.08 cc/g, desirably 0.2 cc/g, and the average pore diameter is about 15 to about 100 Å (1.5 to 10 nm), desirably 40 to 90 Å (4 to 9 nm), but these pores are intended to be those measured by nitrogen adsorption.

Texaco Sudhakar (U.S. Pat. No. 5,624,547) describes an activated carbon catalyst, but discloses that this catalyst is used after treatment with phosphoric acid or together with a metal on the activated carbon itself.

The subject of treatment in the US publication is distillates of less than 350° C., that is, gas oil.

Any of the above shown publications are concerned with activated carbon having those physical properties (e.g., specific surface area, pore volume, and average pore size) of pores which were measured by a nitrogen adsorption method.

JP-A 2001-9282, being equivalent to DE-A 10020723, describes a method of hydrocracking heavy oil as a subject of treatment by a catalyst characterized by those physical properties of pores which were measured by the same nitrogen adsorption method as above.

DISCLOSURE OF THE INVENTION

Because a catalyst is used in fluid catalytic cracking or hydrocracking, the content of nickel and vanadium and the content of residual carbon in heavy oil as a raw oil are limited. Coke is formed in the process of fluid catalytic cracking reaction where the amount of coke accumulated on the catalyst is increased in proportion to the content of residual carbon in the raw oil. In a regeneration tower, the catalyst is regenerated by burning the coke, but when the amount of accumulated coke is large, the temperature in the regeneration tower is increased to deteriorate the catalyst. Nickel and particularly vanadium destroy the crystalline structure of zeolite to deteriorate the activity.

The process of removing asphaltene and impurities such as nickel and vanadium with a solvent is a method of merely separating asphaltene, and thus asphaltene in the raw oil is separated as it is, and therefore, as the raw oil becomes heavy, the amount of asphaltene after separation is increased to make use thereof problematic.

In the hydrocracking process, an alumina supported catalyst is usually used, and pores are designed to have a relatively large size in order to reduce the clogging of catalyst pores with accumulated nickel and vanadium, but as described by Speight, J. G. in The Chemistry and Technology of Petroleum, Marcel Dekker (1980), acidic sites of the original alumina carrier are effective in hydrocracking activity, but are poisoned by a basic compound contained in heavy oil. Activated carbon has less acidic sites than in the alumina catalyst, and metal oxides carried on the activated carbon carrier can be easily activated.

As described by Godfried M. K. Abotsi and Alan W. Scanroni in Fuel Processing Technology, 22, pp 107-133 (1989), alumina is problematic in that a metal oxide carried on the carrier is hardly reduced to form an active metal species.

The means to solve the problem is as follows:

In the prior patent publications above cited, some of the physical properties of pores in activated carbon, that is, specific surface area, pore volume and average pore size are measured by the nitrogen adsorption method, and the effectiveness of pores with diameter in the range of up to about 100 nm (1000 Å (angstroms)) measured by the nitrogen adsorption method is described. In the present application, on the other hand, a distribution of larger pores, not measured by the conventional nitrogen adsorption method, which were given to activated carbon obtained by molding with an extrusion molding machine etc. is prescribed by mercury porosimetry. It is an object of the invention to enable a method effective in hydrocracking of heavy oil. By giving the larger pores, asphaltene contained in heavy oil of high molecular size, and heavy fractions containing impurities such as heavy nickel and vanadium, are easily diffused into pores of activated carbon thereby effectively removing and capturing heavy metals such as nickel and vanadium.

The invention provides a method of hydrocracking heavy oil, comprising the step of hydrocracking heavy oil in a fixed bed, a moving bed or an ebullating bed with a hydrocracking catalyst comprising activated carbon extrudate as a carrier activated with steam and having a high distribution of pores having pore diameter in the range of 20 to 200 nm and any one of the group VIIIB metals selected from iron, nickel and cobalt or molybdenum, both nickel and molybdenum, or both cobalt and molybdenum, under the conditions of a pressure of 8 to 20 MPa, a temperature of 380 to 450° C., an LHSV of 0.1 to 1.0 hr−1, and an H2/oil ratio of 350 to 1500 Nm3/kl-oil.

Herein, LHSV is the Liquid Hourly Space Velocity, expressed in liters-feed per liters-catalyst, per hour. Nm3/kl means Standard cubic meters (H2) per kilo-liters (oil).

The present invention provides a hydrocracking catalyst comprising activated carbon extrudate as a carrier activated with steam and having a high distribution of pores having pore diameter in the range of 20 to 200 nm and any one of the group VIIIB metals selected from iron, nickel and cobalt or molybdenum, both nickel and molybdenum, or both cobalt and molybdenum.

The invention provides a hydrocracking catalyst, comprising activated carbon extrudate as a carrier, activated with steam, and having a pore size distribution with a high proportion of pores having pore diameter in the range of 20 to 200 nm, the pore size distribution particularly having a peak; and any one of the group VIII metals selected from iron, nickel, and cobalt, or molybdenum; both nickel and molybdenum; or both cobalt and molybdenum.

The invention provides a process of manufacturing a hydrocracking catalyst, comprising the steps of providing a starting carbon source, grinding said starting carbon source into fine particles; preparing an extrudable mixture from said fine particles; molding the material by extruding; activating the extrudate with an activating gas; and converting the activated carbon extrudate into the catalyst by adding a catalyzing metal or metal compound; characterized in that said activating gas comprises steam and optionally air, such that the oxygen content is not more than 6 vol %.

The invention provides a catalyst obtainable by the above shown process. The catalyst may be used in the hydrocracking method.

The invention provides use of the above shown catalyst for hydrocracking a heavy oil.

The present invention makes use of an activated carbon catalyst thereby adsorbing and cracking asphaltene contained in heavy oil, effectively removing impurities such as nickel and vanadium, and enabling hydrocracking with less formation of coke.

That is, the advantages of the present invention are as follows:

Activated carbon has affinity for heavy fractions and selectively adsorbs asphaltene containing a large amount of impurities such as nickel and vanadium.

Activated carbon has a relatively large pore size to facilitate diffusion of heavy fractions containing e.g. asphaltene of large molecular weight into pores.

Unstable hydrocarbon radicals formed by cracking of heavy oil containing a large amount of asphaltene are hydrogenated so that the chain reaction of the hydrocarbon radicals is regulated and the formation of coke by the polycondensation reaction of the hydrocarbon radicals is inhibited.

Acidic sites of the conventional alumina supported catalyst are poisoned by basic compounds contained in heavy oil so that the activity is significantly lowered thus resulting in formation of coke, whereas activated carbon has less acidic sites and thus the activity is hardly lowered.

Activated carbon has a high specific area to permit an active metal for hydrogenation to be highly dispersed and carried thereon.

The highly dispersed metal oxide can be activated more easily than the alumina catalyst, and the carried metal species is effectively used.

Activated carbon has a large volume of pores to exhibit high tolerance to accumulation of nickel and vanadium removed from raw oil.

Accordingly, the activated carbon catalyst is effective as a catalyst forming less coke, incorporating a larger amount of removed heavy metal, and undergoing less deterioration in the hydrocracking reaction of heavy oil than the conventional catalyst.

Further, the used activated carbon catalyst having nickel and vanadium accumulated thereon can be subjected to burning treatment to recover nickel and vanadium easily.

DETAILED EXPLANATION OF THE INVENTION

Hereinafter, the present invention is described in more detail. The catalyst of the invention is a hydrocracking catalyst comprising activated carbon extrudate as a carrier activated with steam and having a high distribution of pores having pore diameter in the range of 20 to 200 nm, which is preferably a hydrocracking catalyst having activated carbon as a carrier prepared by molding Australian Yalloum brown coal as a carbon source in an extrusion molding machine and then activating it with steam.

Preferably effective in hydrocracking is a hydrocracking catalyst comprising activated carbon extrudate as a carrier, wherein the volume of pores determined by mercury porosimetry is 0.7 to 1.8 ml/g, more preferably 0.8 to 1.6 ml/g, even more preferably 1.05 to 1.55 ml/g, the proportion of pores having pore diameter in the range of 20 to 200 nm is 20 vol % or more, more preferably 25 vol % or more, even more preferably 30 vol % or more, and the ratio by volume of pores having pore diameter in the range of 38 to 90 nm to pores having pore diameter in the range of 20 to 200 nm is 40% or more, more preferably 43% or more, even more preferably 45% or more.

Preferably effective in hydrocracking is a hydrocracking catalyst comprising activated carbon extrudate as a carrier, wherein the differential pore size distribution has a peak, said peak being in the pore size range 20 to 200 nm, more preferably in the pore size range 38 to 90 nm, even more preferably in the pore size range 40 to 60 nm, said peak having a height of at least 0.4 cm3/g, more preferably at least 0.5 cm3/g, even more preferably at least 0.6 cm3/g.

More preferable is a catalyst using activated carbon whose ability to adsorb asphaltene is 22%/ml or more, having the same properties as above in view of the volume of pores determined by mercury porosimetry, the proportion of pores having pore diameter in the range of 20 to 200 nm and the ratio by volume of pores having pore diameter in the range of 38 to 90 nm to pores having pore diameter in the range of 20 to 200 nm.

Any one of the group VIIIB metals such as iron, nickel and cobalt, or molybdenum, both nickel and molybdenum, or both cobalt and molybdenum are carried on activated carbon to form the catalyst.

The group VIIIB metals preferably include iron, nickel or cobalt.

The catalyst component may be selected from any one of the group VIIIB metals, molybdenum, a mixture of nickel and molybdenum and a mixture of cobalt and molybdenum.

The present invention also relates to a method of hydrocracking heavy oil in a fixed bed, a moving bed or a ebullating bed with the hydrocracking catalyst under the conditions of a pressure of 8 to 20 MPa, a temperature of 380 to 450° C., an LHSV of 0.1 to 1.0 hr−1, and an H2/oil ratio of 350 to 1500 Nm3/kl-oil. Preferably, the heavy oil used in this method is a hydrocarbon oil containing 70 vol % fraction or more with the boiling point at 525° C. or more, a hydrocarbon oil containing at least 200 to 2000 wppm nickel and/or vanadium as heavy metal, or a hydrocarbon oil containing 8 to 30 wt % asphaltene (heptane insolubles).

Method of Producing Activated Carbon

Figure 1:
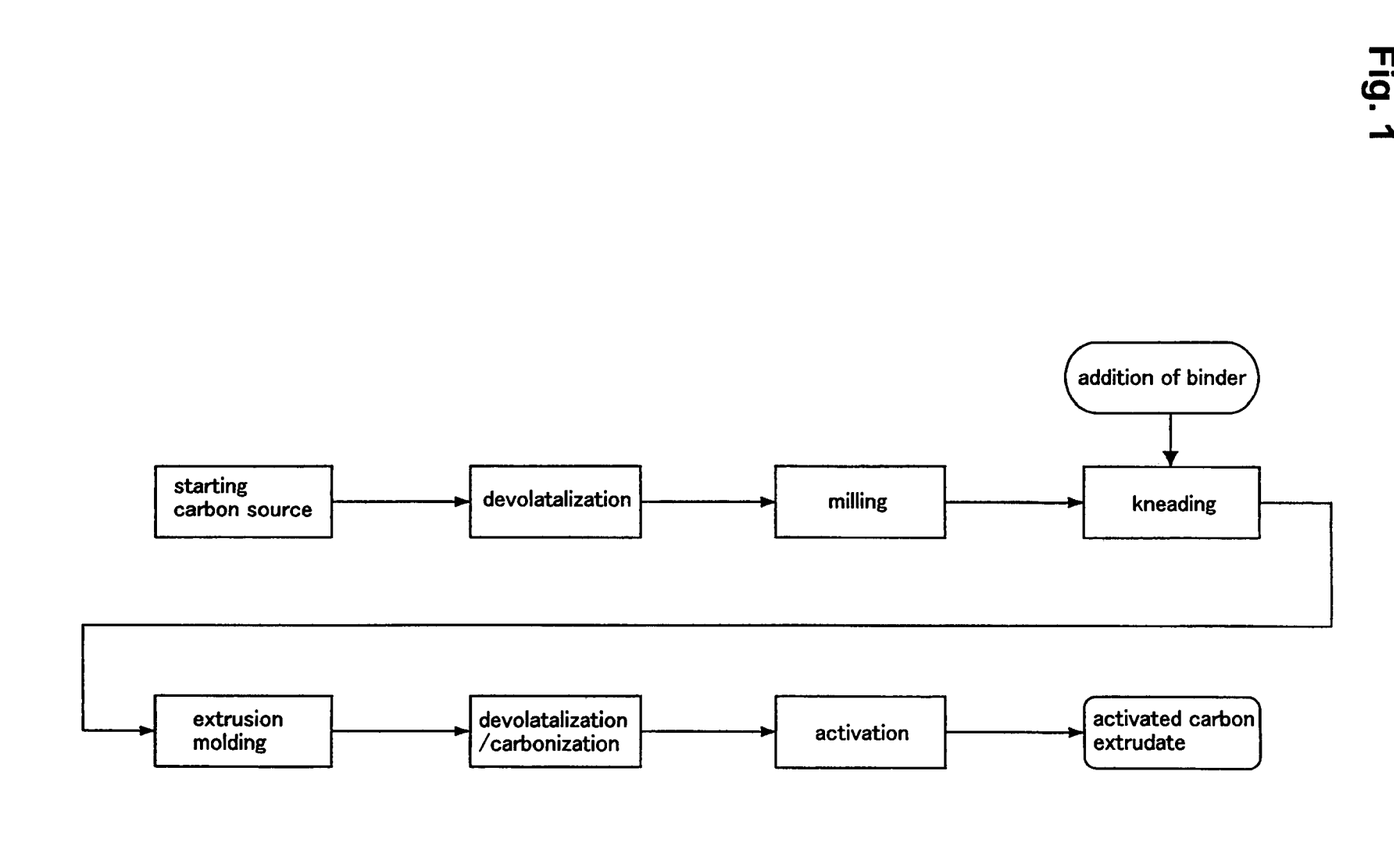
FIG. 1 is an illustration showing a general process of producing activated carbon extrudate.

Activated carbon extrudate is produced by a general method. The starting carbon source of activated carbon includes charcoal, coconut shell carbon, peat, lignite, brown coal, bituminous coal, petroleum cokes, etc. FIG. 1 shows a method of producing activated carbon extrudate. The starting carbon source is roughly ground into course particles of 8/32 mesh size and then devolatalized at 200 to 300° C., and the devolatalized product is then finely ground until the content of fine particles of not greater than 280 mesh size reaches 75 to 85 wt % or more. About 0.5 part of a binder such as tar, pitch and starch is mixed with 1 part of the devolatalized product, then water is added in a water content of 10 to 20% by weight, and the mixture is kneaded uniformly. The material is molded by extruding it at a pressure of 300 to 600 MPa through a die arranged in an extrusion molding machine. The opening diameter of the die is selected depending on the use of activated carbon, and in this example, a die having a diameter of 1 mm was used.

To activate the activated carbon extrudate, a method of using a rotary kiln is generally known. The activating gas used may be steam, carbon dioxide, air or a mixed fluid thereof, but carbon dioxide is poor in reactivity, thus requiring a longer time for activation, and is effective in development of only micropores of 2 nm or less.

It is preferable that the activating gas comprises steam and optionally air, such that the oxygen content is not more than 4 vol %.

Air can also be mixed, but when air is mixed such that the amount of oxygen is higher than 4 vol %, 50 nm or more macropores are merely increased, and the ratio by volume of pores having pore sizes in the range of 38 to 90 nm to pores having pore sizes in the range of 20 to 200 nm in the present invention is decreased. In the present invention, steam which is highly reactive and can achieve the distribution of pores having the most suitable size for the present invention is more preferable. First, the extruded product is dried at about 140° C. in air or a combustion gas and then carbonized at 400 to 600° C., and then the resulting carbonized material are fed to a rotary kiln and activated with steam at a temperature of 800 to 950° C. In these steps, the extruded product becomes activated carbon having a diameter ($\phi$) of 1 mm and a length (L) of 3 to 8 mm. The optimum activation time is selected depending on the easiness of activation of the starting carbon source, the intended pore volume, specific surface area, pore distribution etc. That is, when the activation time is short, pores are undeveloped. When the activation time is increased, the crushing strength of the resulting activated carbon is lowered to cause a problem that the activated carbon cannot endure industrial use or the yield is decreased to bring about an economic disadvantage. The standard activation time used in the present invention is preferably 4 to 12 hours, more preferably 6 to 9 hours. The extrudate may be again activated with the activated carbon for an additional 2 to 8 hours, more preferably about 3 to 5 hours.

Pores having a radius of 50 nm or less in the activated carbon thus prepared were measured for their physical properties such as specific surface area and pore volume by a BET nitrogen adsorption method and for their pore size distribution and average pore diameter by a B. J. H method. Pores having a radius in the range of 3.2 to 100,000 nm were measured for their pore volume and pore size distribution (with Autopore III9420 unit manufactured by MICROMERITICS) by mercury porosimetry.

Ability to Adsorb Asphaltene

Heavy oil contains a large amount of asphaltene, and this asphaltene contains impurities such as sulfur and nitrogen and heavy metals such as nickel and vanadium. Asphaltene is a compound of relatively high molecular weight, and the easiness of adsorption of asphaltene into the catalyst and diffusion thereof into pores is important for hydrocracking of heavy oil.

Now, the ability of various kinds of activated carbon to adsorb asphaltene was examined in the following adsorption test. 20 g vacuum residual oil and 1 g activated carbon were placed in a glass container. Several glass containers containing similarly prepared different kinds of activated carbon were placed in a 1 L autoclave shown in FIG. 3 and then kept under the conditions of a hydrogen pressure of 10 MPa and a temperature of 250° C. for 2 hours, and then cooled and depressurized, and these glass containers were removed, and the activated carbon therein was separated from the vacuum residual oil by filtration. The concentration of asphaltene in the vacuum residual oil after separation was determined, and on the basis of the difference of this determined concentration from the concentration of asphaltene in the original vacuum residual oil, the weight amount of asphaltene adsorbed into each activated carbon was determined, and the weight amount of asphaltene adsorbed per unit weight of activated carbon per unit volume of pores was regarded as the ability to adsorb asphaltene, and the abilities of various kinds of activated carbon were compared. Normal heptane (nC7) insolubles were regarded as asphaltene, and the concentration thereof was measured according to ASTM D3279. The vacuum residual oil was from the Middle East crude, and had the following main properties: API 5.35; 22.4 wt % CCR (carbon residue), 4.02 wt % sulfur, 0.53 wt % nitrogen, 53 wppm nickel, 180 wppm vanadium and 9.08 wt % asphaltene (nC7 Insols.).

API refers to API gravity, and CCR refers to Conradson carbon residue. The "wppm" given to nickel and vanadium is a unit on a weight basis.

The result indicated that the activated carbon having an absolute value of pore volume in the range of 0.8 ml/g or more and having a high distribution of pores with the diameter in the range of 20 to 200 nm was excellent in the ability to adsorb asphaltene.

Conversion of the Activated Carbon Extrudate into a Catalyst

The method of permitting the activated carbon to carry metal was conducted by a generally known method of impregnation/evaporation into dryness with an aqueous solution of a metal nitrate compound, and thereafter, the nitrate was pyrolyzed in a nitrogen atmosphere, whereby a catalyst carrying metal thereon was obtained.

Now, one example where iron is carried on the catalyst is described. 50 g activated carbon extrudate and 350 ml distilled water are introduced into a 1 L separable flask and degassed at room temperature for 30 minutes at a reduced pressure of 10 torr. Ferric nitrate.9H2O (Fe(NO3)3.9H2O) is weighed in such a predetermined amount that the amount of the carried metal is 10 wt % relative to the activated carbon extrudate, followed by adding distilled water thereto to prepare an aqueous solution. Preferably, 36.173 g ferric nitrate is dissolved in 150 g distilled water, and the activated carbon extrudate previously degassed under reduced pressure is added thereto. This aqueous solution containing the activated carbon extrudate is heated to 80 to 90° C. under stirring in a hot water bath and evaporated into dryness until water disappears. The resulting product is vacuum-dried at 130° C., 10 torr, for 1 hour. The resulting activated carbon extrudate having iron carried thereon is packed in a quartz tube and kept at 150° C. for 1 hour in a nitrogen stream, to eliminate water completely. Subsequently, the sample was heated to 450° C. and kept at 1 hour thereby decomposing the nitrate, to give a catalyst.

When a metal is to be carried, a method of using an oil-soluble metal can also be used.

Ability to Suppress Formation of Coke

In the process of hydrocracking reaction, a bond of hydrocarbon having a relatively high molecular weight is cleaved to generate a hydrocarbon radical. This hydrocarbon radical is highly reactive and causes chain reaction, thus leading to the extreme progress of the reaction of forming light products by cracking in one hand and the progress of the polycondensation reaction of mutually bonding hydrocarbon radicals on the other hand, resulting in loss of the phase equilibrium of liquid components to precipitate high-molecular distillates as sediment by phase separation. A unit or pipe is contaminated or clogged with the precipitated or settled sediment, thus hindering operation in hydrocracking facilities.

With respect to the distribution of products, gas is generated in a larger amount by overcracking reaction of light products, and the yield of desired distillates such as naphtha, kerosene and light oil is reduced, while coke is formed finally by the polycondensation reaction.

Figure 3:
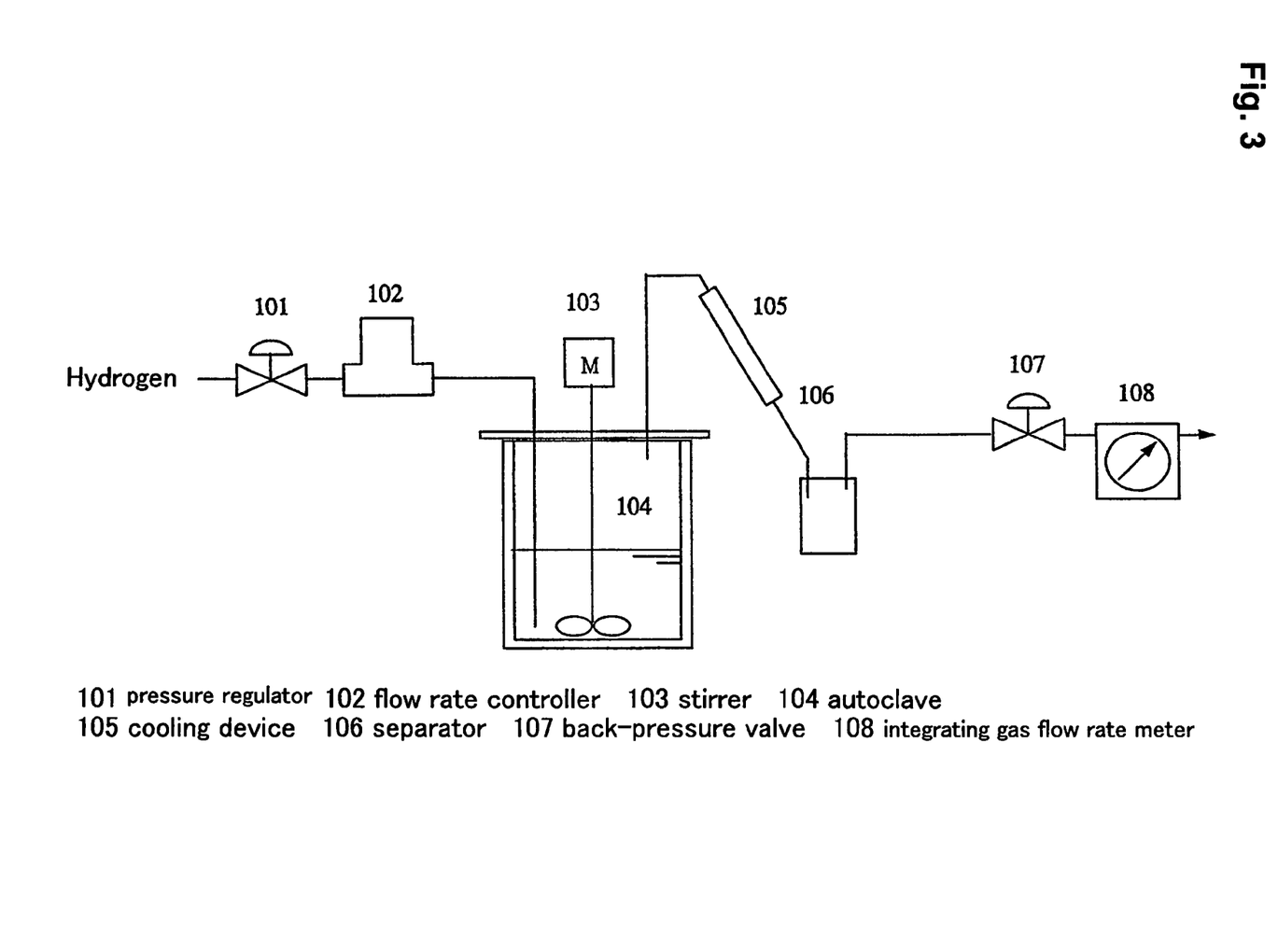
FIG. 3 is an illustration showing an autoclave.

Now, the catalyst prepared by carrying iron on activated carbon extrudate was used in a hydrocracking test in a 1 L autoclave shown in FIG. 3, and the amount of coke formed by the hydrocracking reaction was quantified.

About 200 g vacuum residual oil and the activated carbon extrudate catalyst in an amount of 10 wt % relative to the vacuum residual oil were charged into an autoclave shown in FIG. 3, then pressurized with hydrogen at 10 MPa, heated to 400 to 430° C. and subjected to hydrocracking for a predetermined time (1 to 3 hours). After the reaction was finished, the whole material in the autoclave was filtered with a 5-micron filter, and the solids (residues) remaining on the filter were extracted with toluene in a Soxhlet extractor. The remaining solids on the filter were vacuum-dried at 8 to 15 torr at 130° C. for a predetermined time, then measured for their weight, and quantified as toluene insolubles, and the difference of the measured weight from the weight of the initially charged activated carbon extrudate catalyst was regarded as the amount of coke formed. The weight percentage of the determined amount of formed coke, relative to the vacuum residual oil charged into the autoclave before the reaction, was expressed as the degree of formation of coke. The degrees of formation of coke at the same degree of conversion by the hydrocracking reaction were compared. A lower degree of formation of coke is indicative of a higher ability to suppress formation of coke.

The degree of conversion and the degree of formation of coke are defined as follows:

Degree of conversion(wt %)=100×(gas+the fraction with the boiling point at 525° C. or more in hydrocracked oil)(weight)/the fraction with the boiling point at 525° C. or more in vacuum residual oil charged(weight)

Degree of formation of coke(wt %)=100×(amount of coke formed)(weight)/vacuum residual oil charged(weight)

EXAMPLES

Hereinafter, the present invention is described in more detail by reference to the Examples.

Example 1

Various kinds of activated carbon were prepared by the above-described method of producing activated carbon extrudate.

The states of Preparations 1, 2 and 3 prepared in Examples 1-1, 1-2 and 1-3 from Yalloum brown coal as the starting carbon source by changing the activation time are shown in Table 1. Commercial Product 1 in Comparative Example 1-1 and Commercial Product 2 in Comparative Example 1-2 are commercial activated carbon made of peat, and Commercial Product 3 in Example 1-4 is produced by activating Comparative Product 2 (activated carbon) again with steam for 3 hours to change its pore structure. Australian Yalloum brown coal could be used as the carbon source to produce activated carbon wherein the ratio by volume of pores having pore diameter in the range of 38 to 90 nm to pores having pore diameter in the range of 20 to 200 nm was 45% or more.

A patent application (JP-A 2001-9282) concerning activated carbon as a catalyst for hydrocracking of heavy oils, filed by the present inventors, is milled activated carbon obtained by milling Yalloum brown coal as the carbon source and activating it without molding with a binder etc. The states of this milled activated carbon are shown in Comparative Example 1-3, where the proportion of pores having pore diameter in the range of 20 to 200 nm was as high as 40 vol %, but the ratio by volume of pores having pore diameter in the range of 38 to 90 nm to pores having pore diameter in the range of 20 to 200 nm was as low as 37%.

Figure 2:
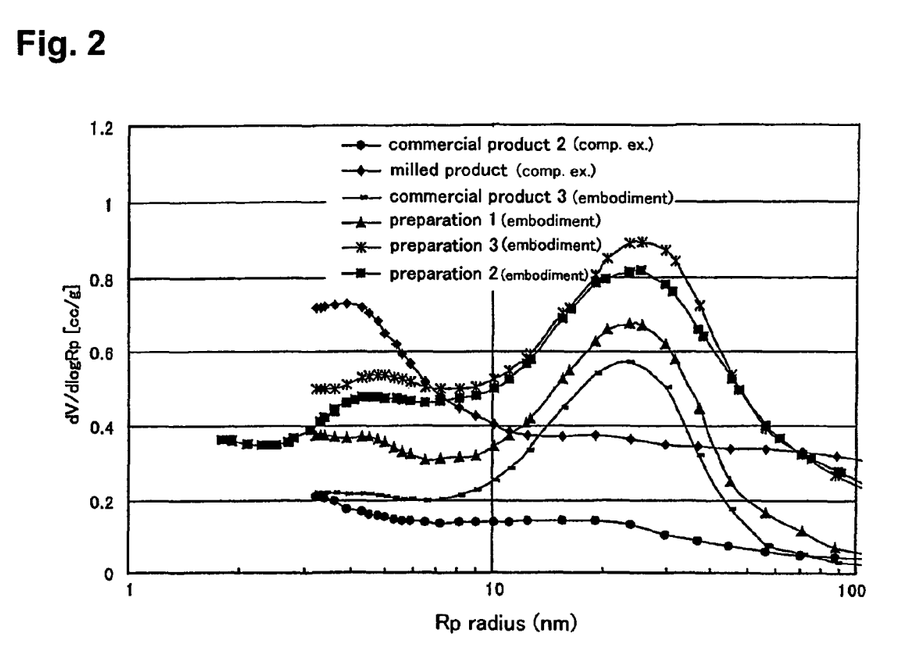
FIG. 2 is a graph showing a distribution of pore sizes in activated carbon.

The distribution of pore sizes in these activated carbon samples is shown in FIG. 2.

In the invention, the catalyst may has a pore size distribution with a high proportion, peak or maximum, of pores having pore diameter in the range of 20 to 200 nm.

As shown in the distribution of pore sizes in FIG. 2, the activated carbon extrudate samples in Examples 1-1, 1-2, 1-3 and 1-4 have a peak in distribution of pore diameter in the range of 38 to 90 nm, while the milled activated carbon in Comparative Example 1-3 has a merely broad distribution of pore diameter in the range of 20 to 200 nm and is different in distribution of pore sizes from the activated carbon extrudate samples of the present invention. As shown in Example 1-4, the same activated carbon extrudate as in Example 1-1, 1-2 and 1-3 could be prepared by activating commercial activated carbon extrudate for a longer time. However, the activated carbon extrudate samples made of Yalloum brown coal in Examples 1-1, 1-2 and 1-3 are superior in the peak of pore distribution (the proportion by volume of pores having pore diameter in the range of 20 to 200 nm, and the ratio by volume of pores having pore diameter in the range of 38 to 90 nm to pores having pore diameter in the range of 20 to 200 nm).

TABLE 1

| | Comparative Example 1-1 | Comparative Example 1-2 | Example 1-4 | Example 1-1 | Example 1-2 | Example 1-3 | Comparative Example 1-3 |
|---|---|---|---|---|---|---|---|
| Activated carbon extrudate | Commercial product 1 | Commercial product 2 | Commercial product 3 | Preparation product 1 | Preparation product 2 | Preparation product 3 | Milled product |
| Activation time (h) | — | Base | Base + 3 | 6 | 7 | 9 | 2 |
| Size | 0.8 mm φ × 3-8 mmL | 0.8 mm φ × 3-8 mmL | 0.8 mm φ × 3-8 mmL | 1 mm φ × 3-8 mmL | 1 mm φ × 3-8 mmL | 1 mm φ × 3-8 mmL | 1.2-2 mm |
| Pore volume (ml/g) by mercury porosimetry | 0.38 | 0.68 | 1.09 | 0.82 | 1.06 | 1.54 | 0.89 |
| Proportion (%) of pores of 20-200 nm | 5 | 18.8 | 30 | 36 | 37 | 40 | 40 |
| Ratio (%) of pores of 38 to 90 nm to pores of 20 to 200 nm | 30 | 40 | 45 | 56 | 54 | 50 | 37 |
| Bulk density (g/ml) | 0.53 | 0.4 | 0.3 | 0.36 | 0.3 | 0.25 | 0.4 |
| Abrasive strength (wt. %) (ASTM D4058) | 98.8 | 98 | 97.4 | 99.2 | 98.3 | 98.6 | 96 |
| Crushing strength (kg/mm) (ASTM D6175) | 0.36 | 0.35 | 0.3 | 0.46 | 0.35 | 0.28 | 0.4 |

Example 2

The ability of activated carbon to adsorb asphaltene was examined by the method described above for the ability to adsorb asphaltene.

Table 2 shows physical properties of activated carbon extrudate not carrying metal.

The vacuum residual oil was from the Middle East crude, and had the following main properties: API 5.35; 22.4 wt % CCR (carbon residue), 4.02 wt % sulfur, 0.53 wt % nitrogen, 53 wppm nickel, 180 wppm vanadium and 9.08 wt % asphaltene (nC7 Insols.).

As can be seen from Table 2, it was found that the activated carbon extrudate having pores with an absolute value of pore volume in the range of 0.8 ml/g or more wherein the proportion of pores having pore diameter in the range of 20 to 200 nm is 30 vol % or more, and the ratio by volume of pores having pore diameter in the range of 38 to 90 nm to pores having pore diameter in the range of 20 to 200 nm is 45% or more is also excellent in the ability to adsorb asphaltene.

Example 3

Activated carbon catalysts were prepared by the method described above for conversion of activated carbon extrudate into a catalyst, and the abilities of the activated carbon catalysts to suppress formation of coke were compared and evaluated by the method described above for the ability to suppress formation of coke.

The vacuum residual oil was from the Middle East crude, and had the following main properties: API 5.35; 22.4 wt % CCR (carbon residue), 4.02 wt % sulfur, 0.53 wt % nitrogen, 53 wppm nickel, 180 wppm vanadium and 9.08 wt % asphaltene (nC7 Insols.).

As shown in Table 3, it was found that the activated carbon extrudate having pores with an absolute value of pore volume in the range of 0.8 ml/g or more wherein the proportion of pores having pore diameter in the range of 20 to 200 nm is 30 vol % or more, the ratio by volume of pores having pore diameter in the range of 38 to 90 nm to pores having pore diameter in the range of 20 to 200 nm is 45% or more, and the ability of the activated carbon to adsorb asphaltene is 22%/ml or more, exhibits a high ability to suppress formation of coke.

TABLE 2

| | Comparative Example 2-1 | Comparative Example 2-2 | Example 2-4 | Example 2-1 | Example 2-2 | Example 2-3 | Comparative Example 2-3 |
|---|---|---|---|---|---|---|---|
| Activated carbon extrudate | Commercial product 1 | Commercial product 2 | Commercial product 3 | Preparation product 1 | Preparation product 2 | Preparation product 3 | Milled product |
| Activation time (h) | — | Base | Base + 3 | 6 | 7 | 9 | 2 |
| Size | 0.8 mm φ × 3-8 mmL | 0.8 mm φ × 3-8 mmL | 0.8 mm φ × 3-8 mmL | 1 mm φ × 3-8 mmL | 1 mm φ × 3-8 mmL | 1 mm φ × 3-8 mmL | 1.2-2 mm |
| Pore volume (ml/g) by mercury porosimetry | 0.38 | 0.68 | 1.09 | 0.82 | 1.06 | 1.54 | 0.89 |
| Proportion (%) of pores of 20-200 nm | 5 | 18.8 | 30 | 36 | 37 | 40 | 40 |
| Ratio (%) of pores of 38 to 90 nm to pores of 20 to 200 nm | 30 | 40 | 45 | 56 | 54 | 50 | 37 |
| Ability to adsorb asphaltene (%/ml) | 3 | 18 | 25 | 22 | 27 | 34 | 21 |

TABLE 3

| | Example 3-1 | Example 3-2 | Example 3-3 | Comparative Example 3-1 | Comparative Example 3-2 | Example 3-4 | Comparative Example 3-3 |
|---|---|---|---|---|---|---|---|
| Catalyst | YA-1 | YA-2 | YA-3 | NR-1 | NR-2 | NR-3 | YA-0 |
| Carried metal/wt. % | iron/10 | iron/10 | iron/10 | iron/10 | iron/10 | iron/10 | iron/10 |
| Activated carbon | Preparation product 1 | Preparation product 2 | Preparation product 3 | Commercial product 1 | Commercial product 2 | Commercial product 3 | Milled product |
| Pore volume (ml/g) | 0.82 | 1.06 | 1.54 | 0.38 | 0.68 | 1.09 | 0.89 |
| Proportion (%) of pores of 20-200 nm | 36 | 37 | 40 | 5.0 | 18.8 | 30 | 40 |
| Ability to adsorb asphaltene (%/ml) | 22 | 27 | 34 | 3 | 18 | 25 | 21 |
| Ratio (%) of pores of 38 to 90 nm to pores of 20 to 200 nm | 56 | 54 | 50 | 30 | 40 | 45 | 37 |
| Carried metal | iron | iron | iron | iron | iron | iron | iron |
| Amount of earned metal (wt. %) | 10 | 10 | 10 | 10 | 10 | 10 | 10 |
| Degree of conversion (wt %) | 81 | 82 | 84 | 80 | 82 | 81 | 80 |
| Degree of formation of coke (wt %) | 6.8 | 6.2 | 5.5 | 12 | 9 | 6.9 | 7.5 |

Raw oil: Vacuum residual oil from the Middle East Crude
API: 5.35, CCR: 22.4 wt. %, nC7Insol.: 9.08 wt. %, S: 4.02 wt. %, N: 0.53 wt. %, Ni: 53 wppm, V: 180 wppm
Pressure: 10 Mpa, Temperature: 425° C., Time: 90 minutes

Example 4

Figure 4:
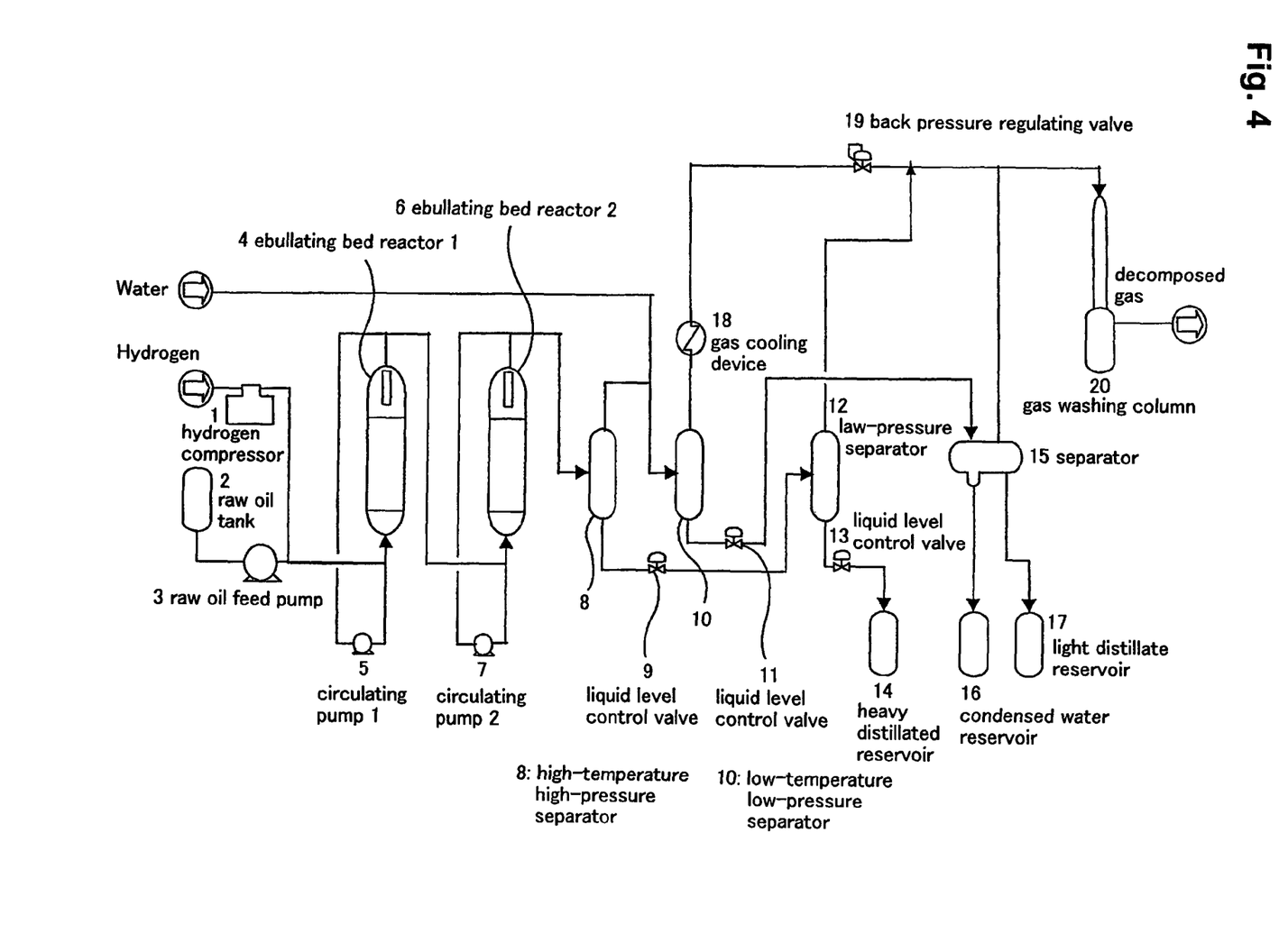
FIG. 4 is an illustration showing an ebullating bed reaction unit used in the present invention.

FIG. 4 shows an ebullating bed reaction unit. Reactors each having an internal volume of 1 L charged with a catalyst are arranged in series. The system is charged with light oil such as gas oil. By a hydrogen compressor (1), hydrogen is introduced into the system, and the system is kept at a predetermined pressure by a gas pressure regulating valve (19). A gas oil is circulated by circulating pumps (5) and (7) to fluidize the catalyst charged in ebullating bed reactors (4) and (6), while the system is heated to an allowable temperature for vacuum residual oil. Vacuum residual oil is fed through a raw oil feed pump (3) from a raw oil tank (2) and heated to a predetermined reaction temperature to initiate hydrocracking reaction. From the effluent from the reactor, heavy distillates are separated in a high-temperature high-pressure separator (8), and after gas is separated in a low-pressure separator (12), the heavy distillates are sent to a heavy distillate reservoir (14). Light distillates separated in the high-temperature high-pressure separator (8) are separated from gas in a low-pressure high-temperature separator (10), and in a separator (15), the light distillates are separated from water injected into the line, and the water is sent to a condensed water reservoir (16), while the light distillates are sent to a light distillate reservoir (17). From the gas separated in each separator, hydrogen sulfide is separated in a gas washing column (20), measured for its flow rate and then discharged into the outside of the system.

In the unit having two 1 L ebullating bed reactors connected in series shown in FIG. 4, the hydrocracking ability of the activated carbon extruded catalyst carrying iron was examined. The results in Example 4 are shown in Table 4 in comparison to the performance of a commercial alumina catalyst in similar ebullating bed reactors.

When the activated carbon catalyst YA-1 in Example 4-1 and the commercial alumina catalyst in Comparative Example 4-1 were compared at the same degree of conversion, the activated carbon catalyst YA-1 showed a higher degree of removal of metal and a lower amount of sediment. The degree of conversion in Example 4-2 was 64 wt % which is higher than the degree of conversion (55 wt %) in Comparative Example 4-1, and the amount of sediment was 0.8% which is lower than 0.9% in Comparative Example 4-1, thus indicating that a higher degree of conversion could be achieved by using the activated carbon catalyst.

TABLE 4

| | Example 4-1 | Example 4-2 | Example 4-3 | Comparative Example 4-1 |
|---|---|---|---|---|
| Catalyst | YA-1 | YA-1 | YA-1 | Commercail alumina catalyst |
| Carried metal/wt. % | iron/10 | iron/10 | iron/10 | nickel/2.5, molybdenum/9.5 |
| Temperature (° C.) | 415 | 419 | 422 | 415 |
| Degree of conversion (wt %) | 55 | 64 | 71 | 55 |
| Degree of desulfurization (%) | 42 | 49 | 51 | 70 |
| Degree of removal of metal (%) | 77 | 84 | 88 | 65 |
| Sediment (%) (ASTM D4870) | 0.28 | 0.8 | 1.1 | 0.9 |

Raw oil: Mixture of Maya/Isthmus vacuum residual oil
API: 3.73, CCR: 22.6 wt. %, nC7Insol.: 17.8 wt. %, S: 4.51 wt. %, N: 0.61 wt. %, Ni: 84 wppm, V: 418 wppm
Pressure: 18.5 Mpa, LHSV: 0.3 $hr^{-1}$, $H_2$/Oil ratio: 1335 $Nm^3$/kl-oil Degree of desulfurization(%)=100×weight of hydrogen sulfide in gas/weight of sulfur in raw oil Degree of removal of metal(%)=100×weight of(nickel+vanadium)in hydrocracked oil/weight of(nickel+vanadium)in raw oil

Example 5

Figure 5:
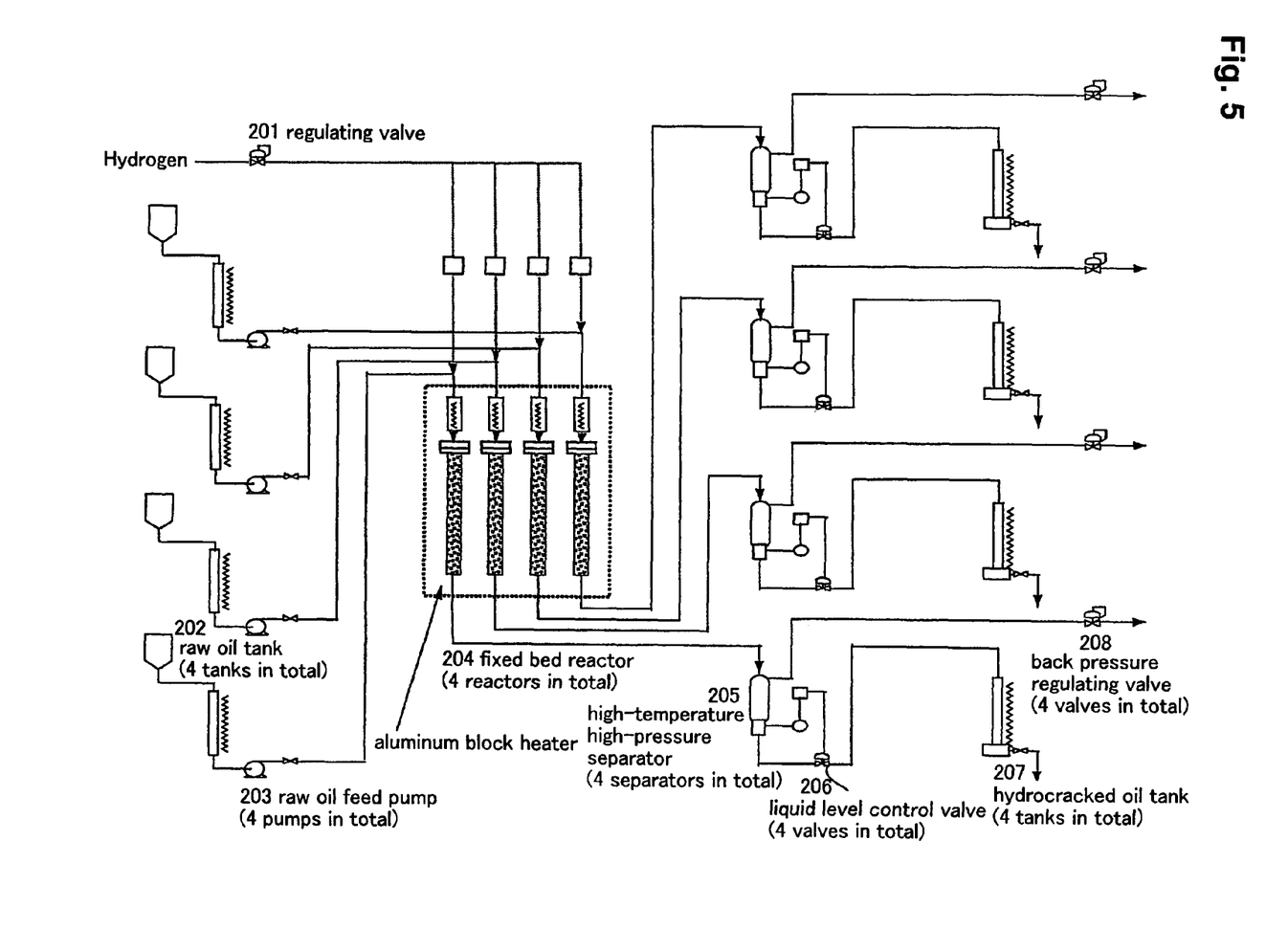
FIG. 5 is an illustration showing a fixed bed reaction unit (A) used in the present invention.

FIG. 5 shows a fixed bed reaction unit (A). Four fixed bed reactors (204) charged with catalysts (each volume 120 cc) are heated with the same aluminum block heater. Hydrogen is introduced through a regulating valve (201) into the system, and the pressure in the system is kept constant with a back pressure regulating valve (208). A raw oil in a raw oil tank (202) is fed by a raw oil feed pump (203) to a fixed bed reactor (204). From an effluent from the reactor, gas is separated in a high-temperature high-pressure separator (205), and the hydrocracked oil is sent to a cracked oil tank (207). The separated gas is discharged via a back pressure regulating valve (208) into the outside of the system.

The four reactors (each having a volume of 120 cc) shown in FIG. 5 are arranged in parallel, and hydrocracking shown in Table 5 is conducted by the fixed bed reaction unit placed in the same heating furnace to compare the performance of the activated carbon extrudate YA-1 carrying iron with that of a commercial alumina catalyst. The activated carbon catalyst YA-1 and the commercial alumina catalyst used were taken out after 100 hours of test, and one typical catalyst particle was embedded with resin and its cross section was polished and examined for the distribution of concentration of vanadium across the cross section by an electron probe microanalyzer (EPMA) method with EPMA2000 (accelerating voltage, 15 kV; beam size, 3 μmφ; step size, horizon 3 μm and vertical 3 μm) manufactured by Shimadzu Corporation. When the distribution of vanadium on the basis of this result is expressed in terms of the ratio of the concentration of vanadium on the surface of the catalyst particle to the concentration of vanadium in the center of the particle, the concentration ratio in the activated carbon extrudate catalyst YA-1 in Example 5-2 is 2.2 which is lower than the concentration ratio (23) in the commercial alumina catalyst in Comparative Example 5-1, thus indicating that vanadium is distributed uniformly from the surface to center of the particle. In the commercial alumina catalyst, pores are clogged with vanadium accumulated on the surface of the particle, and thus pores in the center are not effectively used, but in the activated carbon extrudate catalyst, asphaltene is diffused into pores, and the whole of the pores in the catalyst particle are used effectively to remove vanadium.

While iron was carried on the activated carbon extrudate catalyst YA-1 in Example 5-2, nickel and molybdenum were carried on the activated carbon extrudate catalyst YA-1X in Example 5-1, and succeeded in improving the degree of desulfurization without changing other performance.

Example 6

Figure 6:
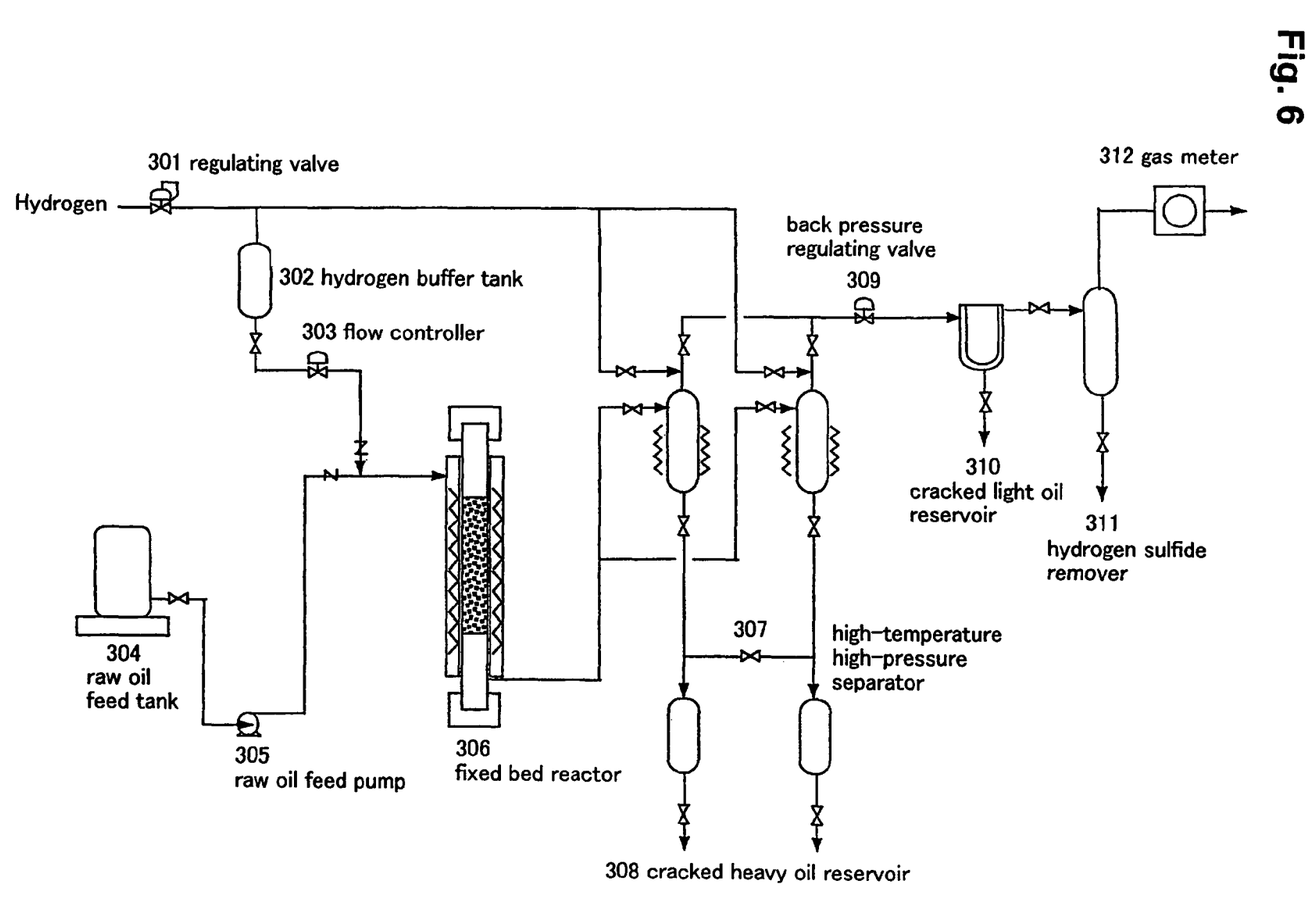
FIG. 6 is an illustration showing a fixed bed reaction unit (B) used in the present invention.

FIG. 6 shows a fixed bed reaction unit (B). A reactor (306) (volume 700 cc) is charged with a catalyst, and hydrogen from a cylinder is depressurized with a regulating valve (301), and hydrogen is transferred via a hydrogen buffer tank (302) and sent at a predetermined rate with a flow controller (313). The pressure in the system is kept constant with a back pressure regulating valve (309). A raw oil in a raw oil tank (304) is fed by a raw oil feed pump (305) to a fixed bed reactor (306). From an effluent from the reactor, gas is separated in a high-temperature high-pressure separator (307), and the gas is depressurized to the atmospheric pressure via the back pressure regulating valve (309), and a small amount of cracked light oil are separated in a light cracked oil reservoir (310) and then transferred via a hydrogen sulfide remover (311) and measured for the amount of gas with a gas meter (312), and the gas is discharged to the outside of the system. The cracked heavy oil separated in the high-temperature high-pressure separator (307) is sent to a heavy cracked oil reservoir (308).

By the fixed bed reaction unit (B) (internal volume 700 cc) shown in FIG. 6, the deactivation behavior of the activated carbon extrudate catalyst YA-3X shown in Table 6 was compared with that of a commercial alumina catalyst by carrying out a hydrocracking reaction. When the amounts of nickel and vanadium accumulated on each catalyst reached 5% and 30% respectively relative to the weight of the new catalyst, each catalyst was examined for the degree of conversion, the degree of desulfurization and the degree of removal of metal. By comparing reductions in the degree of conversion, the degree of desulfurization and the degree of removal of metal, the activity of the activated carbon extrudate catalyst YA-3X in Example 6-1 was hardly reduced, while the activity of the commercial alumina catalyst in Comparative Example 6-1 was significantly reduced.

TABLE 5

|  | Example 5-1 | Example 5-2 | Comparative Example 5-1 |
|---|---|---|---|
| Catalyst | YA-1X | YA-1 | Commercail alumina catalyst |
| Carried metal/wt. % | nickel/2.8, molybdenum/9.0 | iron/10 | nickel/2.5, molybdenum/9.5 |
| Degree of conversion (wt %) | 65 | 64 | 73 |
| Degree of desulfurization (%) | 67 | 53 | 95 |
| Degree of removal of nickel (%) | 82 | 86 | 96 |
| Degree of removal of vanadium (%) | 96 | 96 | 99 |
| Ratio of vanadium concentration (−) catalyst-particle surface/catalyst-particle center | 2.4 | 2.2 | 23 |
| Sediment (%) | 0.003 | <0.001 | 0.07 |

Raw oil: Mixture of Maya/Mesa/Arabian light crudes vacuum residual oil
API: 5.9, CCR: 20.8 wt. %, S: 5.1 wt. %, N: 0.38 wt. %, Ni: 75 wppm, V: 340 wppm
Pressure: 18.5 Mpa, Temperature: 422° C., LHSV: 0.25 $hr^{-1}$, $H_2$/Oil ratio: 935 $Nm^3$/kl-oil

TABLE 6

| | Example 6-1 | | Comparative Example 6-1 | |
|---|---|---|---|---|
| Catalyst | YA-3X | | Commercail alumina catalyst | |
| Carried metal/wt. % | nickel/1.7, molybdenum/7.0 | | nickel/2.5, molybdenum/9.5 | |
| Accumulated metal wt. (% relative to new catalyst) | 5 | 30 | 5 | 30 |
| Degree of conversion (wt %) | 52 | 48 | 50 | 40 |
| Reduction (%) in hydrocracking activity | — | 8 | — | 20 |
| Degree of desulfurization (%) | 40 | 38 | 62 | 52 |
| Reduction (%) in desulfurization activity | — | 5 | — | 16 |
| Degree of removal of metal (%) | 65 | 64 | 78 | 76 |
| Reduction (%) in degree of activity of removal of metal | — | 1 | — | 2.6 |
| Raw oil | Mixed Maya vacuum residual oil API: 4.56, CCR: 22.66 wt. %, nC7Insols.: 20.57 wt. %, S: 5.01 wt. %, N: 0.608 wt. %, Ni: 113 wppm, V: 551 wppm | | Maya vacuum residual oil API: 2.39, CCR: 25.04 wt. %, nC7Insols.: 22.59 wt. %, S: 5.88 wt. %, Ni: 127 wppm, V: 583 wppm | |
| Hydrocracking conditions | 12 Mpa, 432° C., LHSV: 0.5 hr$^{-1}$ H$_2$/Oil ratio: 980 Nm$^3$/kl-oil | | 12 Mpa, 420° C., LHSV: 0.5 hr$^{-1}$ H$_2$/Oil ratio: 980 Nm$^3$/kl-oil | |

Reduction in degree of activity=100×(activity with 5 wt % accumulated metal−activity with 30 wt % accumulated metal)/activity with 5 wt % accumulated metal The present invention provides a process of hydrocracking heavy oil with a catalyst in petroleum refining, which enables hydrocracking to give light hydrocarbon oil with less formation of coke, while asphaltene contained in the heavy oil is selectively adsorbed and cracked and impurities including heavy metals such as nickel and vanadium are selectively removed.

The catalyst of the invention can be used as a catalyst which has less reduction in activity and high tolerance to accumulation of heavy metals such as nickel and vanadium contained in heavy oils and is charged in a guard reactor arranged in an upstream of a desulfurization process, for the purpose of removing heavy metals in heavy oils.

What is claimed is:

1. A method of hydrocracking heavy oil comprising the step of hydrocracking the heavy oil in a fixed bed, a moving bed, or an ebulltaing bed with a hydrocarbon catalyst under the conditions of a pressure of 8 to 20 MPa, a temperature of 380 to 450° C., a LHSV of 0.1 to 1.0 hr$^{-1}$ and an H$_2$/oil ratio of 350 to 1500 Nm$^3$/kL-oil, the hydrocracking catalyst comprising activated carbon extrudate as a carrier, which is activated with steam and has a proportion of pores having a pore diameter in the range of 20 to 200 nm of at least 20 vol %, the ratio by volume of pores having a pore diameter in the range of 38 to 90 nm to pores having a pore diameter in the range of 20 to 200 nm is at least 40% and has a pore size distribution having a peak in the range of 20 to 200 nm, the pore volume being measure by mercury porosimetry, wherein the catalyst consists of the said activated carbon extrudate and a member selected from the group consisting of nickel, cobalt, molybdenum, nickel and molybdenum, and cobalt and molybdenum.

2. The method according to claim 1, wherein the heavy oil is a hydrocarbon oil containing 70 vol % fraction or more with the boiling point at 525° C. or more, a hydrocarbon oil containing at least 200 to 2000 wppm nickel and/or vanadium as heavy metal, or a hydrocarbon oil containing 8 to 30 wt % asphaltene.

3. The method according to claim 1, wherein, in the activated carbon extrudate, the volume of pores, as determined by mercury porosimetry, is 0.7 to 1.8 ml/g.

4. The method according to claim 1, wherein, in the activated carbon extrudate, the volume of pores determined by mercury porosimetry is 0.7 to 1.8 ml/g and the ability of the activated carbon to adsorb asphaltene is 22%/ml or more.

5. The method according to claim 1, wherein the catalyst comprises cobalt or nickel as the catalyst component.

6. The method according to claim 1, wherein the catalyst is obtained by a process comprising the steps of providing a starting carbon source, grinding said starting carbon source into fine particles; preparing an extrudable mixture from said fine particles; molding the extrudable mixture by extruding to form a carbon extrudate; activating the extrudate with an activating gas comprising steam and, optionally, air, such that the oxygen content is not more than 4 vol %; and converting the activated carbon extrudate into a catalyst by adding a catalyzing metal or metal compound.

* * * * *